(12) United States Patent
Immenschuh et al.

(10) Patent No.: US 12,442,299 B2
(45) Date of Patent: Oct. 14, 2025

(54) INJECTION DRIVER ASSEMBLY FOR HOLLOW BAR BOLT INSTALLATION

(71) Applicant: Cementation USA Inc., Sandy, UT (US)

(72) Inventors: Steven Immenschuh, Herriman, UT (US); Jeremy Hailey, Herriman, UT (US); Jordan Latva, Herriman, UT (US); Everett Bird, Salt Lake City, UT (US); Roman Karasek-Jimenez, Sandy, UT (US); Buck Chamberlain, Wallsburg, UT (US)

(73) Assignee: Cementation USA Inc., Sandy, UT (US)

( * ) Notice: Subject to any disclaimer, the term of this patent is extended or adjusted under 35 U.S.C. 154(b) by 250 days.

(21) Appl. No.: 18/358,422

(22) Filed: Jul. 25, 2023

(65) Prior Publication Data

US 2025/0034997 A1    Jan. 30, 2025

(51) Int. Cl.
*E21D 20/02* (2006.01)
*B23P 19/06* (2006.01)

(52) U.S. Cl.
CPC .......... *E21D 20/028* (2013.01); *B23P 19/067* (2013.01)

(58) Field of Classification Search
CPC ..... E21D 20/08; E21D 21/00; E21D 21/0093; B23P 19/067; E02D 5/80; E02D 5/801
See application file for complete search history.

(56) References Cited

U.S. PATENT DOCUMENTS

| | | | | |
|---|---|---|---|---|
| 10,859,122 B2 * | 12/2020 | Paros | ......... | F16D 1/02 |
| 2019/0063504 A1 * | 2/2019 | Paros | ......... | F16D 1/02 |

FOREIGN PATENT DOCUMENTS

| | | |
|---|---|---|
| CN | 106499351 A | 3/2017 |
| CN | 112360507 A | 2/2021 |
| CN | 112627870 B | 4/2022 |
| WO | 2013/170312 A1 | 11/2013 |

OTHER PUBLICATIONS

International Searching Authority, International Search Report and the Written Opinion, Oct. 31, 2023.

* cited by examiner

*Primary Examiner* — Kyle Armstrong
(74) *Attorney, Agent, or Firm* — Kirton McConkie; Brian Tucker

(57) ABSTRACT

An injection driver assembly may be used to install hollow bar bolts. The injection driver assembly may include a socket that can be rotated to drive hollow bar bolts into a wall or other structure. The injection driver assembly may also include a housing assembly that allows hardening product to be injected into a hollow bar bolt while the socket is positioned overtop the hollow bar bolt and remains capable of rotating.

16 Claims, 16 Drawing Sheets

INJECTION DRIVER ASSEMBLY FOR HOLLOW BAR BOLT INSTALLATION

CROSS-REFERENCE TO RELATED APPLICATIONS

N/A

BACKGROUND

Hollow bar bolts are used in various applications such as for tunneling, earth retention, building site development, and foundation reinforcement. For example, hollow bar bolts may be used in tunneling to secure a mesh material overtop the tunnel surface to prevent the tunnel from caving in. Because the hollow bar bolt is hollow, grout, resin, or another hardening product can be injected through the bolt once it is in place to fill the hole surrounding the bolt and thereby anchor the bolt.

FIG. 1 provides an example of a prior art hollow bar bolt 100 that may be used in tunneling or another application. Hollow bar bolt 100 includes two sections of hollow bars 110 which are threaded and secured together via a coupler 112, a drill bit 111 which makes hollow bar bolt 100 self-drilling, a plate 113 that functions to hold the mesh material against the tunnel wall, and a nut 114 which is used to drill/insert hollow bar bolt 100 into the tunnel wall and to force plate 113 against the tunnel wall. Hollow bars 110 can have different lengths from what is shown and/or any number of hollow bars 110 may be coupled together so that hollow bar bolt 100 has a desired length. Also, in some instances, hollow bar bolt 100 may not include drill bit 111 but may be threaded into a pre-drilled hole.

FIG. 2 provides an example of how hollow bar bolts 100 can be used to provide support in a tunnel 200. As shown, a number of hollow bar bolts 100 have been drilled into the tunnel wall overtop a mesh 210. Specialized machinery may be used for this purpose. This same machinery may also be used to inject a hardening product through hollow bars 110 so that the hardening product flows out the inside end of hollow bars 110 and back out through the drilled hole. Sufficient hardening material may be injected to encase plates 113 and nuts 114 to thereby lock everything together. In some installations, after the hardening material is injected, the machinery may also be used to tighten nuts 114 until a specified tension has been reached (e.g., 150 foot-pounds of torque). Accordingly, the installation of hollow bar bolts 110 may be a multi-step process where each step requires tedious adjustments to the machinery.

BRIEF SUMMARY

The present invention is generally directed to an injection driver assembly that may be used to install hollow bar bolts. The injection driver assembly may include a socket that can be rotated to drive hollow bar bolts into a wall or other structure. The injection driver assembly may also include a housing assembly that allows hardening product to be injected into a hollow bar bolt while the socket is positioned overtop the hollow bar bolt and remains capable of rotating.

In some embodiments, the present invention may be implemented as an injection driver assembly that includes a socket that is configured to rotate a hollow bar bolt, a driver that is coupled to the socket and configured to rotate the socket, and a housing assembly that is positioned around the driver and configured to enable the socket and driver to rotate relative to the housing assembly. The housing assembly, the driver, and the socket form a pathway for injecting a hardening product into the hollow bar bolt while the hollow bar bolt is positioned within the socket.

In some embodiments, the socket may have a distal end forming a distal opening that is configured to receive and drive a nut of the hollow bar bolt and a proximal end forming a proximal opening that is configured to couple to the driver. The proximal opening may extend into the distal opening to form part of the pathway.

In some embodiments, the driver may include a shaft portion over which the housing assembly is positioned and a proximal coupling portion by which the driver may be coupled to machinery.

In some embodiments, the driver may include a flange positioned between the shaft portion and the proximal coupling portion.

In some embodiments, the shaft portion may include a longitudinal channel and one or more cross channels that intersect with the longitudinal channel to form part of the pathway.

In some embodiments, the longitudinal channel may extend through a distal end of the driver that inserts into the socket.

In some embodiments, the housing assembly may include a housing having one or more injection openings that form part of the pathway.

In some embodiments, the one or more injection openings may be two injection openings.

In some embodiments, the housing assembly may include opposing bushings that are positioned inside the housing on opposing sides of the one or more injection openings.

In some embodiments, the housing assembly may include opposing seals that are positioned inside the respective bushings.

In some embodiments, each bushing may include an exterior annular channel and the housing may include lubricant openings that align with the respective exterior annular channel.

In some embodiments, each bushing may include an interior annual channel and one or more coupling channels that extend between the exterior annular channel and the interior annular channel.

In some embodiments, the pathway may include injection openings formed in a housing of the housing assembly and one or more channels formed in a shaft portion of the driver. The shaft portion may be configured to rotate within the housing of the housing assembly.

In some embodiments, the present invention may be implemented as an injection driver assembly that includes a socket, a driver and a housing assembly. The socket may have a distal opening that is configured to drive a hollow bar bolt and a proximal opening. The proximal opening may be open to the distal opening. The driver may be secured to the socket and may form a longitudinal channel that is open to the distal opening of the socket and one or more cross channels that extend between an outer surface of the driver and the longitudinal channel. The housing assembly may be positioned around the driver and configured to enable the socket and driver to rotate relative to the housing assembly. The housing assembly may have a housing with one or more injection openings that are open to the one or more cross channels such that fluid or material injected through the one or more injection openings can pass into a hollow bar bolt that is positioned within the distal opening of the socket.

In some embodiments, the housing assembly may include opposing bushings that are positioned within the housing on opposing sides of the one or more cross channels.

In some embodiments, the driver may include a distal coupling portion that extends into the proximal opening of the socket. The longitudinal channel may extend through the distal coupling portion.

In some embodiments, the one or more injection openings may be two injection openings that are configured to couple to hoses of machinery that is also used to rotate the driver and the socket.

In some embodiments, the present invention may be implemented as a method for installing a hollow bar bolt. An injection driver assembly may be positioned to drive the hollow bar bolt. The injection driver assembly may include a socket that is configured to receive a nut of the hollow bar bolt, a driver that is coupled to the socket and configured to rotate the socket, and a housing assembly that is positioned around the driver and configured to enable the socket and driver to rotate relative to the housing assembly. While the nut is positioned within the socket, a hardening product may be injected into a pathway formed through the housing assembly, the driver and the socket to cause the hardening product to be injected into the hollow bar bolt. The driver and socket can be rotated relative to the housing assembly while the nut is positioned within the socket and after the hardening product has been injected to thereby drive the hollow bar bolt until a desired tension has been reached.

In some embodiments, a flushing fluid may also be injected into the pathway to flush the hardening product from the pathway.

In some embodiments, prior to injecting the hardening product, the driver and socket can be rotated relative to the housing assembly while the nut is positioned within the socket to drive the hollow bar bolt to a desired depth.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention are directed to injection driver assemblies and their use in installing hollow bar bolts. Embodiments of the present invention may also encompass machinery for installing hollow bar bolts that also includes an injection driver assembly.

Figure 1:
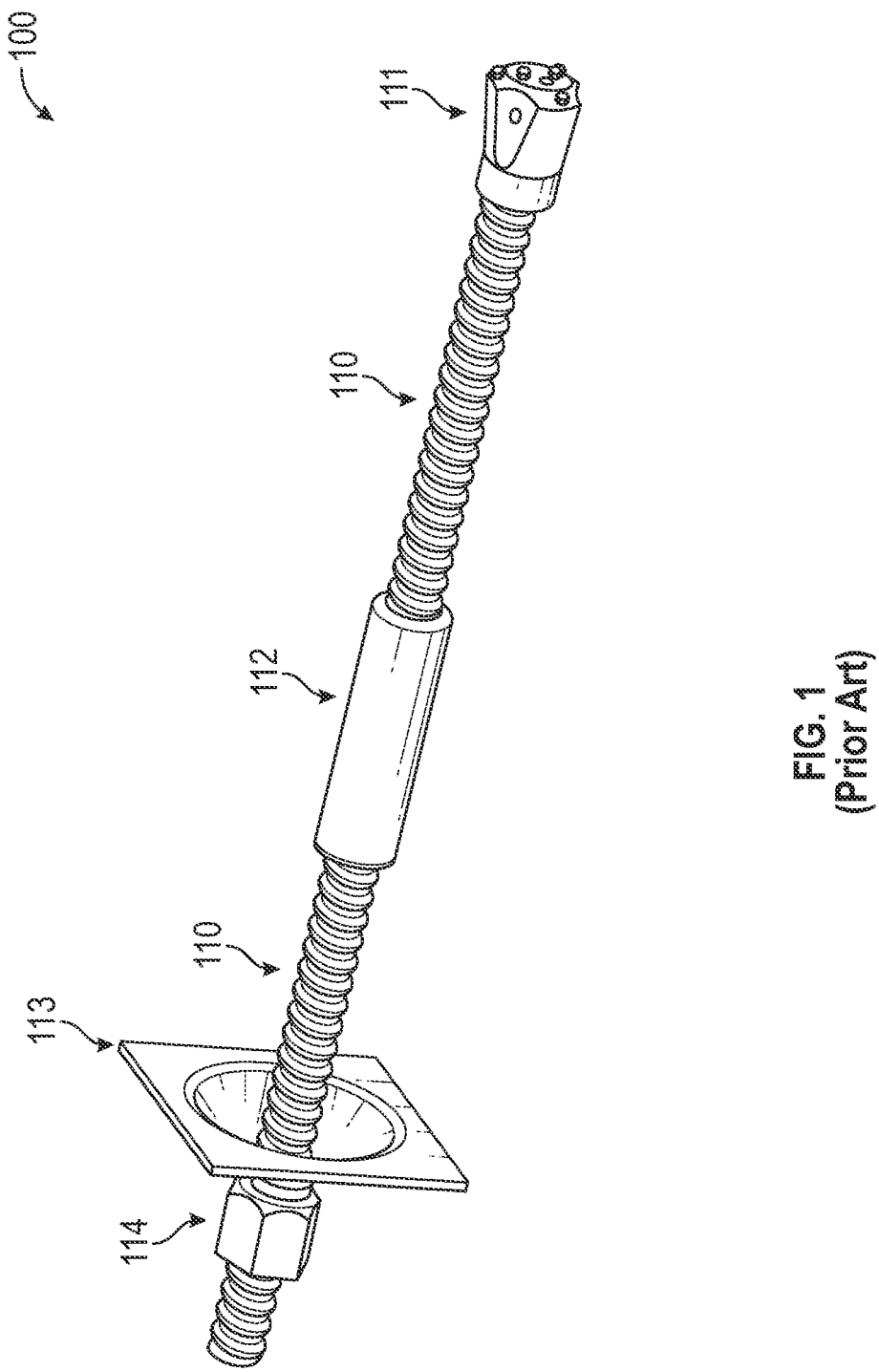
FIG. 1 illustrates a prior art hollow bar bolt.
Figure 2:
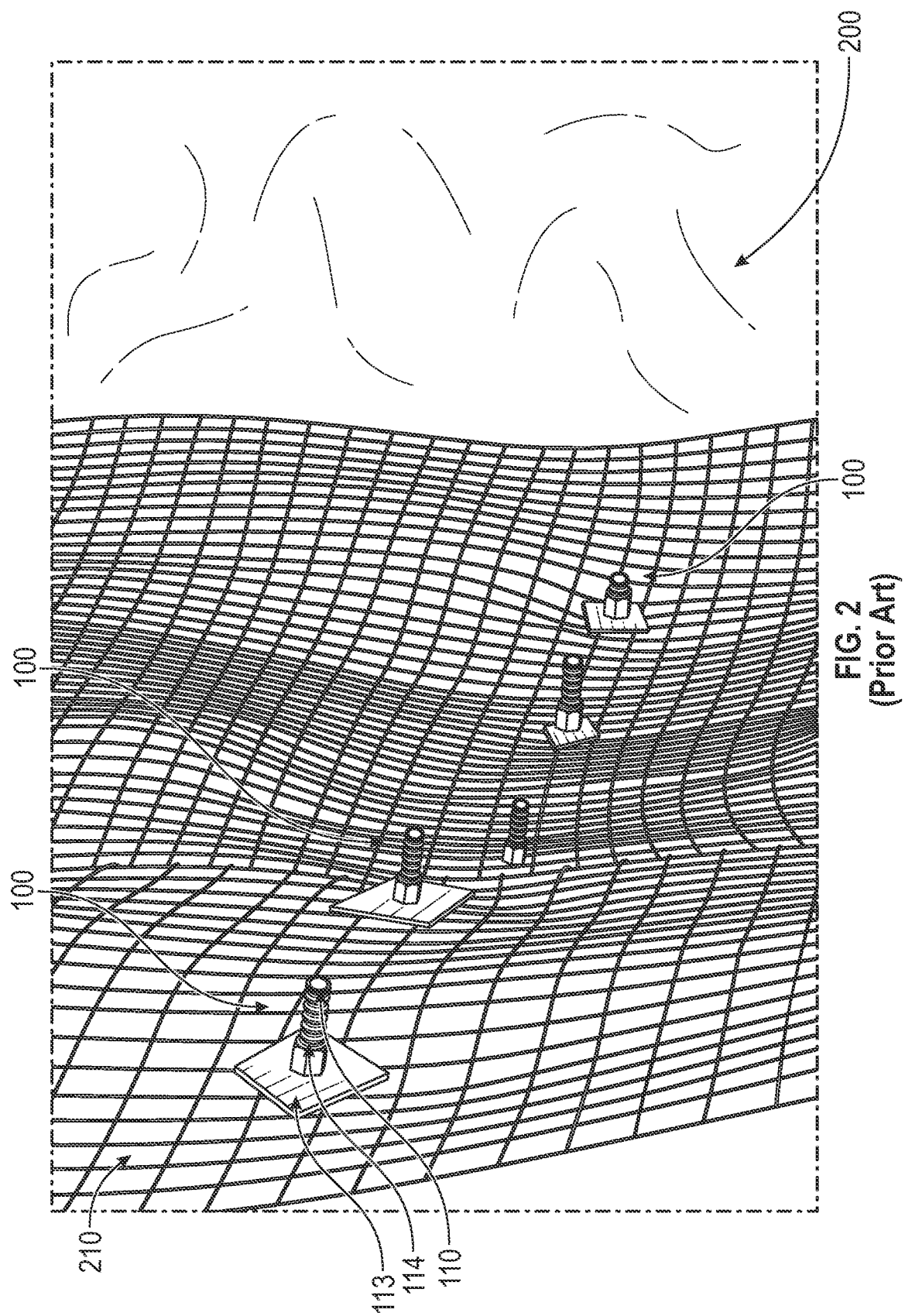
FIG. 2 provides an example of how hollow bar bolts are used in tunneling.
Figure 3A:
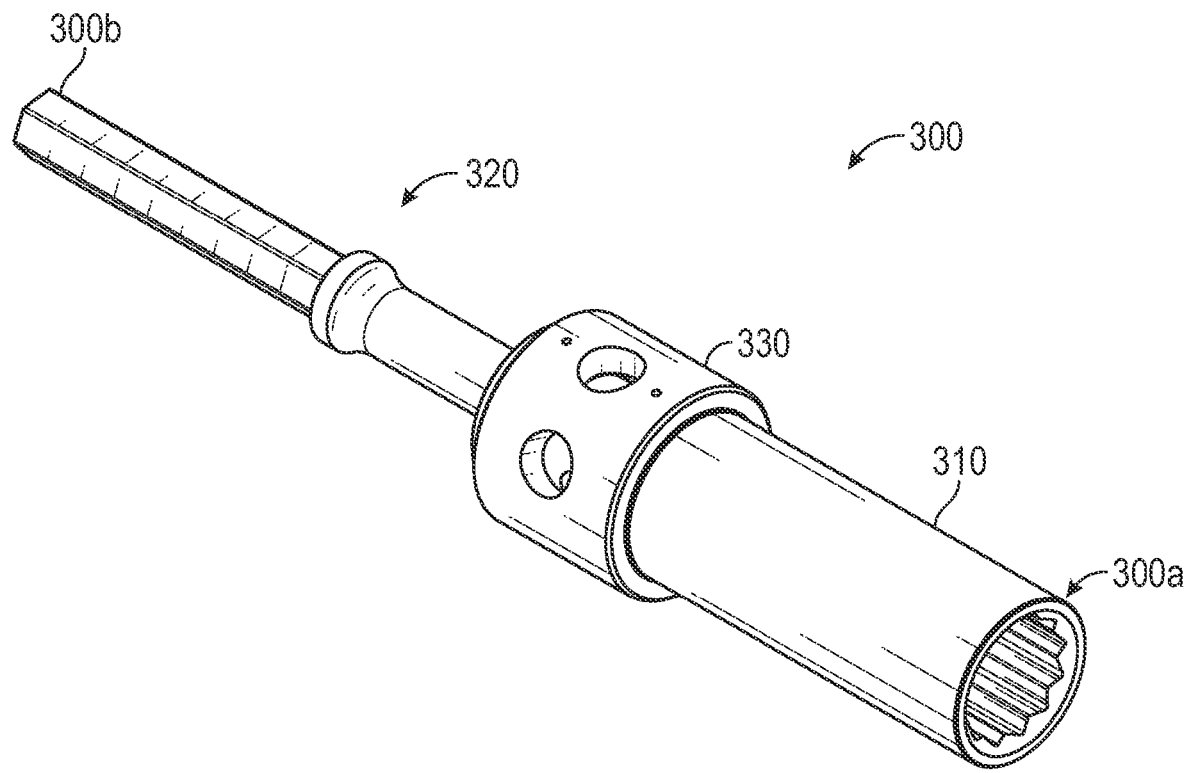
FIGS. 3A and 3B are perspective and side views respectively of an injection driver assembly that is configured in accordance with one or more embodiments of the present invention.
Figure 3B:
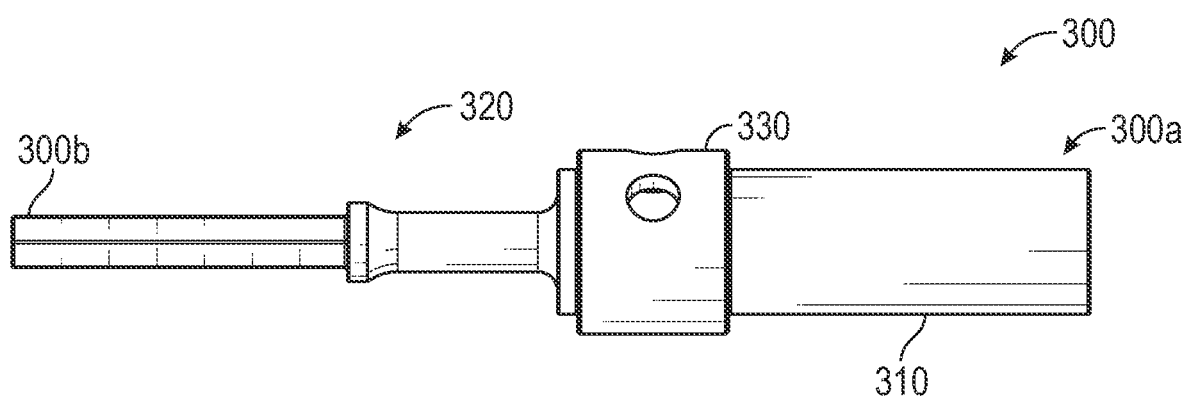

FIGS. 3A and 3B provide an example of an injection driver assembly 300 that is configured in accordance with one or more embodiments of the present invention. Injection driver assembly 300 will be described as having a distal end 300a and a proximal end 300b. In this context, "proximal" represents the end at or by which injection driver assembly 300 is secured to the machinery and "distal" represents the end that is oriented towards the hollow bar bolt during installation.

Injection driver assembly 300 may include a socket 310 that forms distal end 300a, a driver 320 that forms proximal end 300b, and a housing assembly 330 that is positioned around socket 310 and/or driver 320 and is configured to remain stationary (e.g., not to rotate) relative to socket 310 and driver 320 as socket 310 and driver 320 rotate. For example, driver 320 can be coupled to a drill portion of the machinery to allow socket 310 to be rotated to drive a hollow bar bolt into a tunnel wall while housing assembly 330 can be coupled to an injection portion of the machinery to allow water, hardening product, or other fluids or materials to be injected into socket 310 including while it rotates.

Figure 4A:
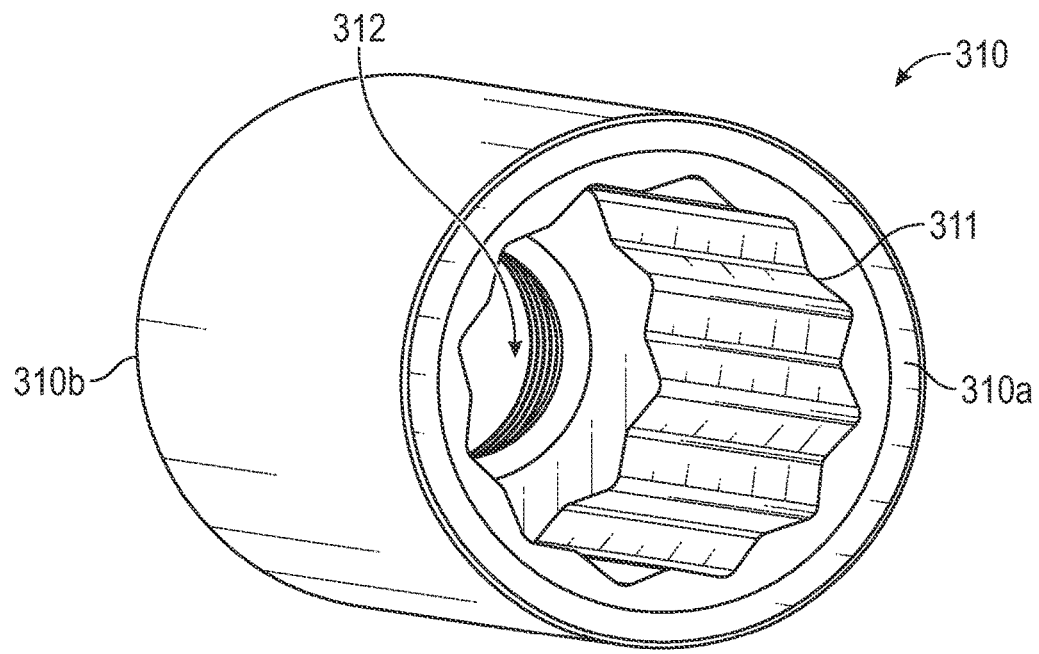
FIGS. 4A and 4B are perspective and cross-sectional views respectively of a socket of the injection driver assembly.
Figure 4B:
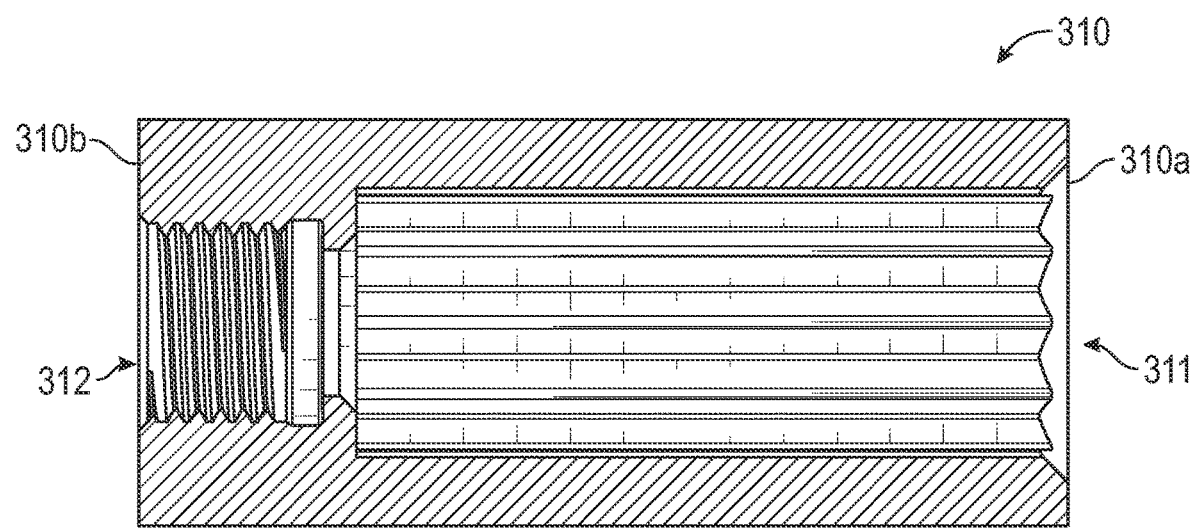

FIGS. 4A and 4B are perspective and cross-sectional views respectively of socket 310 in isolation. Socket 310 has a distal end 310a forming an opening 311 having internal walls that are configured for driving hollow bar bolts. For example, opening 311 can be configured to receive and drive nut 114. Socket 310 also has a proximal end 310b forming an opening 312 that is configured to couple socket 310 to driver 320. For example, opening 312 could be threaded. However, any other coupling configuration could be used. Opening 312 extends into opening 311.

Figure 5A:
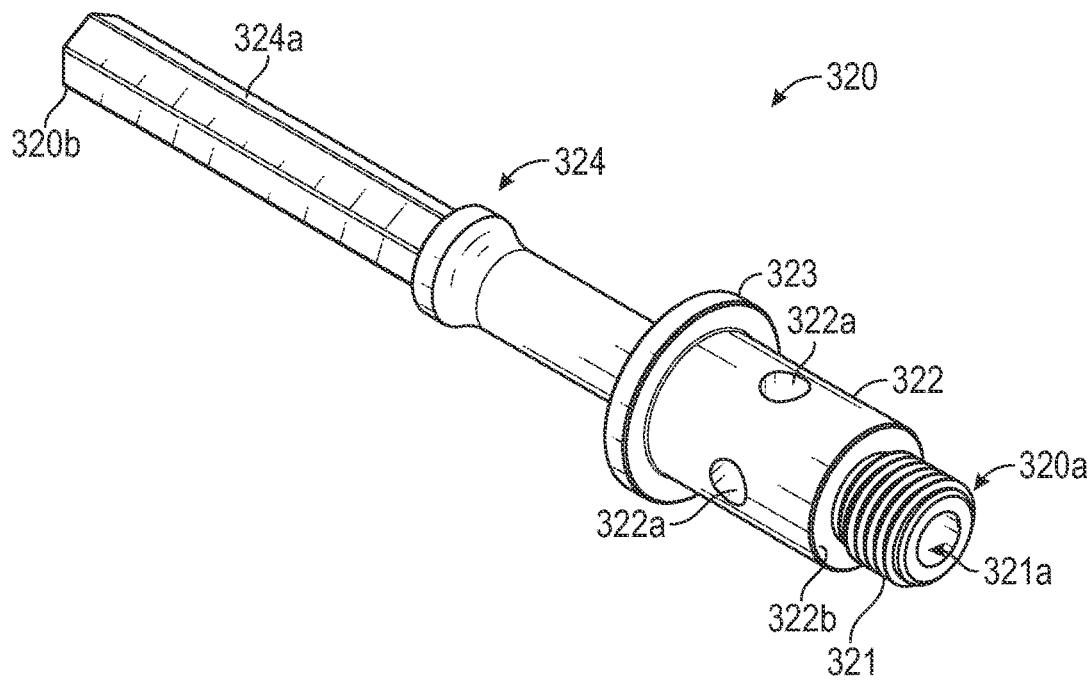
FIGS. 5A-5C are perspective, side and cross-sectional views respectively of a driver of the injection driver assembly.
Figure 5B:
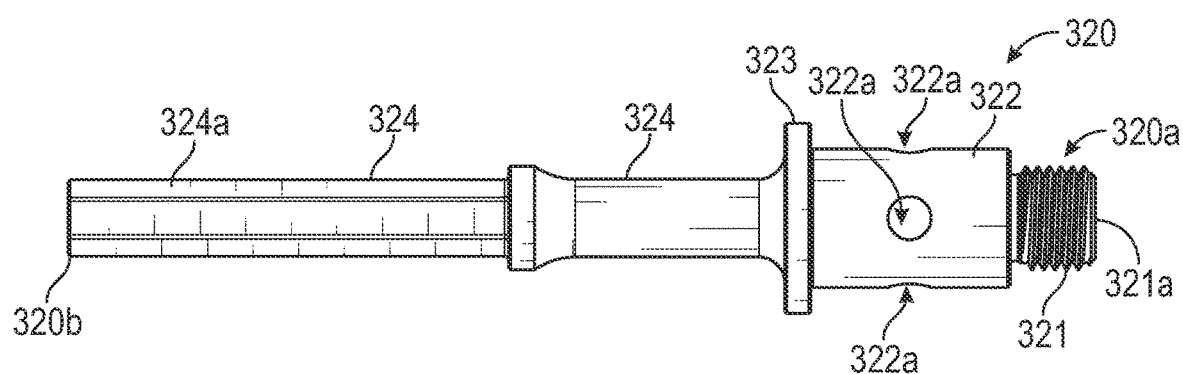
Figure 5C:
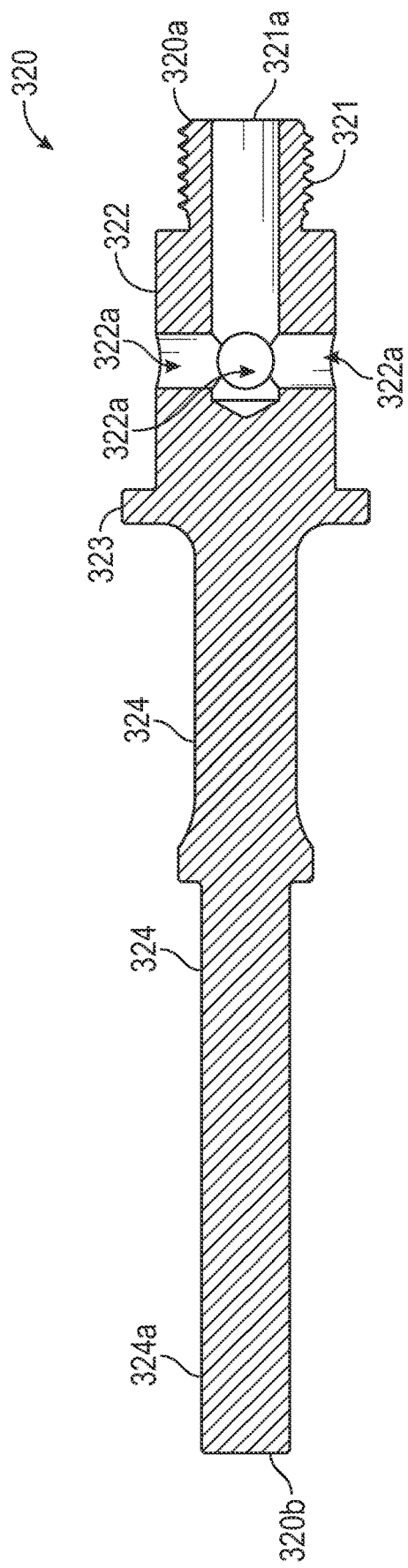

FIGS. 5A-5C are perspective, side and cross-sectional views of driver 320. Driver 320 includes a distal coupling portion 321 at its distal end 320a by which socket 310 can be coupled to driver 320, a shaft portion 322 that is proximal to distal coupling portion 321 and over which housing assembly 330 may be positioned, a flange 323 at a proximal end of shaft portion 322, and a proximal coupling portion 324 by which driver 320 may be coupled to the machinery.

Distal coupling portion 321 can be configured to insert into opening 312 of socket 310 to thereby couple socket 310 to driver 320. For example, in the depicted embodiment, distal coupling portion 321 and opening 312 are threaded. However, any other suitable coupling configuration could be used including welding or other permanent or semi-permanent coupling.

Shaft portion 322 may have a cylindrical shape to thereby allow driver 320 to rotate within housing assembly 330 when housing assembly 330 is positioned around shaft portion 322. Flange 323 can function to retain housing assembly 330 overtop shaft portion 322. For example, when socket 310 is secured onto driver 320, housing assembly 330 may be secured between flange 323 and socket 310.

A longitudinal channel 321a may be formed through distal coupling portion 321 and may extend distally into shaft portion 322. One or more cross channels 322a (four of which are included in the depicted embodiment) may also be formed through shaft portion 322 and may intersect with longitudinal channel 321a. Accordingly, cross channels 322a and longitudinal channel 321a form an internal pathway from the exterior of shaft portion 322 to distal end 320a of driver 320.

In the depicted embodiment, proximal coupling portion 324 includes a hex shaft 324a. However, any other coupling configuration (e.g., R32 rope thread) could be used to allow driver 320 to be coupled to any suitable machinery.

Figure 6A:
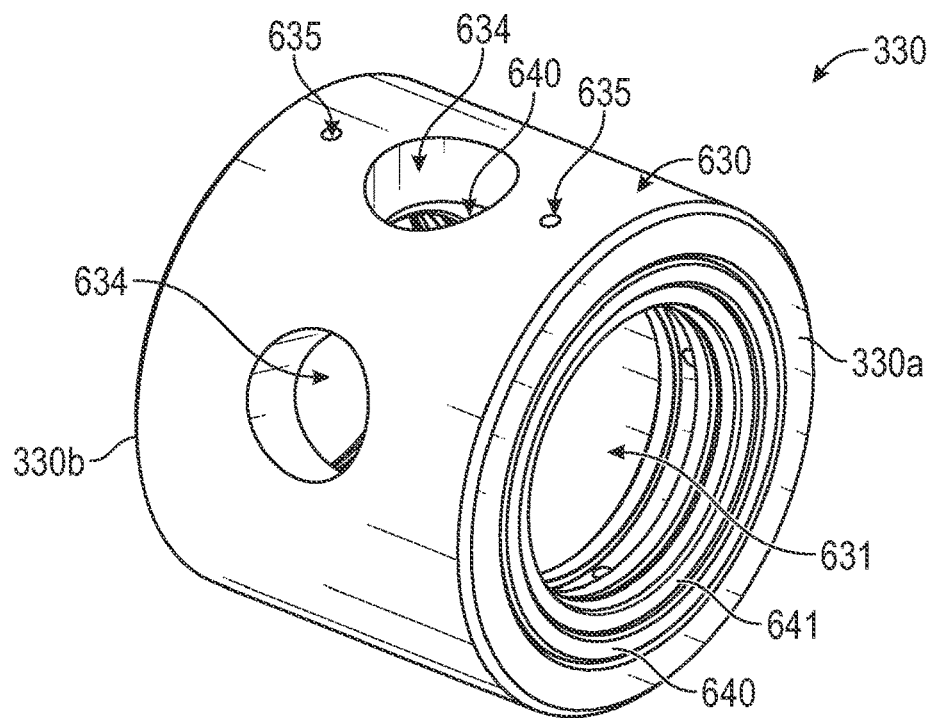
FIGS. 6A and 6B are perspective and exploded views respectively of a housing assembly of the injection driver assembly.
Figure 6B:
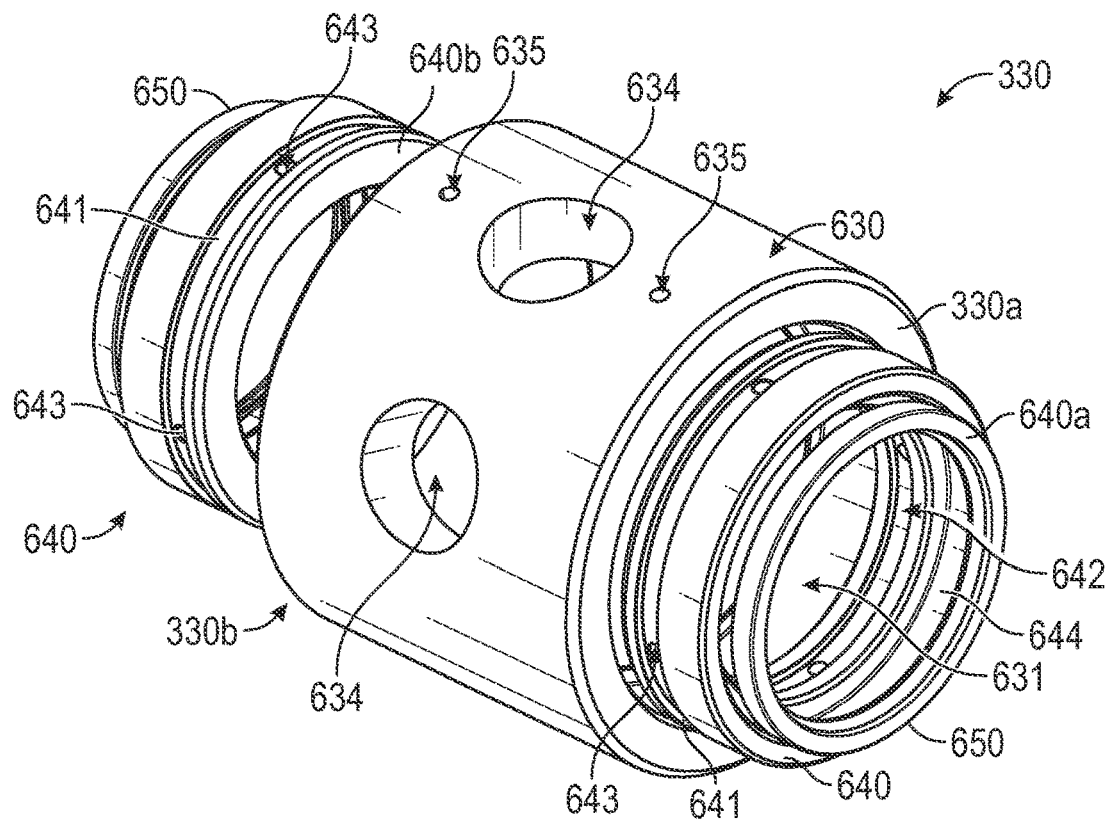
Figure 6C:
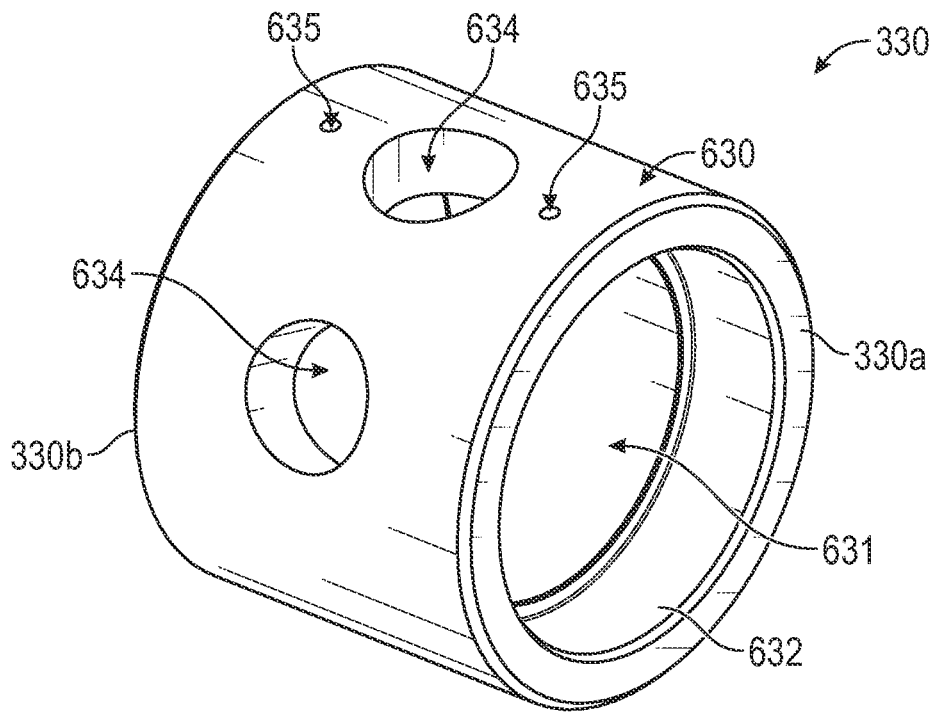
FIGS. 6C and 6D are perspective and cross-sectional views respectively of a housing of the housing assembly.
Figure 6D:
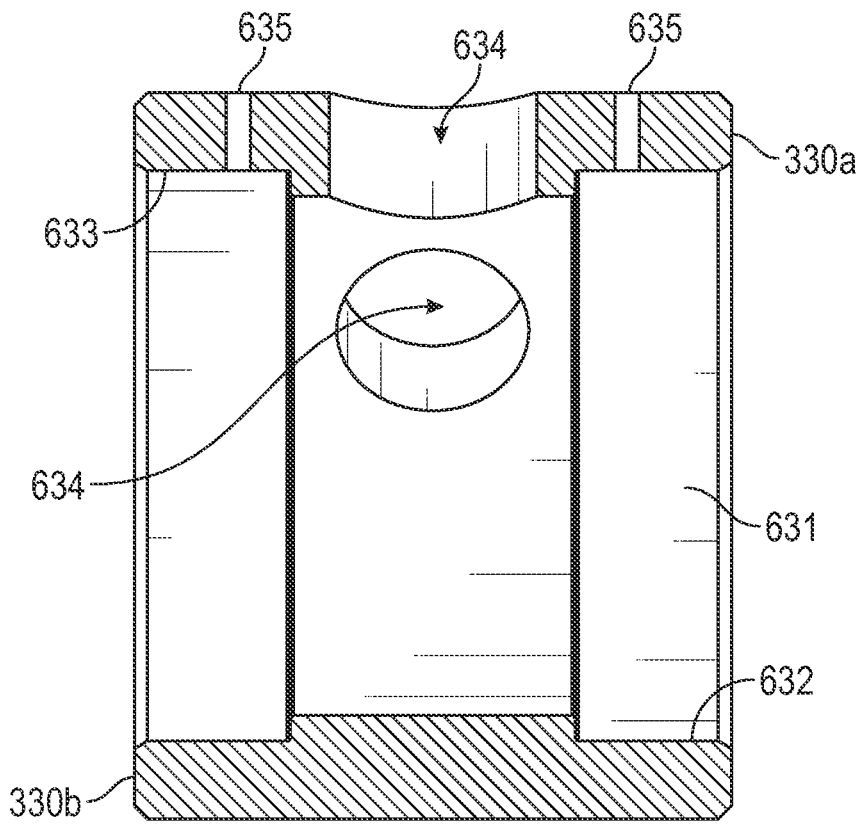

FIGS. 6A and 6B show housing assembly 330 in isolation with FIG. 6B being an exploded view. Housing assembly 330 includes a housing 630, bushings 640 positioned within housing 630 at a distal end 330a and a proximal end 330b of housing assembly 330, and seals 650 positioned within bushings 640. FIGS. 6C and 6D are perspective and cross-sectional views respectively of housing 630 in isolation.

An opening 631, which may have a cylindrical shape, extends through housing 630 to allow housing 630 to be positioned around shaft portion 322. Opening 631 may include widened portions 632 and 633 at distal end 330a and proximal end 330b that may form seats for bushings 640. Injection openings 634 may be formed through the wall of housing 630 between widened portions 632 and 633 so that injection openings 634 are positioned between bushings 640. As described in further detail below, injection openings 634 provide channels for injecting a hardening product inside housing 630, through cross channels 322a and longitudinal channel 321a, into opening 311 of socket 310, and then into the hollow bar(s) of a hollow bar bolt. In some embodiments, injection openings 634 could be threaded to allow hoses of the machinery to be coupled to housing 630. However, any coupling configuration could be used.

Lubricant openings 635 may be formed through the wall of housing 630 and into widened portions 632 and 633. In the depicted embodiment, there is a single lubricant opening 635 corresponding to each bushing 640. Bushing 640 may include an exterior annular channel 641 and an interior annular channel 642 that are aligned with the respective lubricant opening 635. One or more coupling channels 643 may extend between exterior annular channel 641 and interior annular channel 642. Each lubricant opening 635 may be used to inject lubricant into bushing 640. For example, lubricant hoses could be coupled to lubricant openings 635 in any suitable way to inject lubricant through lubricant openings 635 and into exterior annular channel 641. The lubricant may then flow around exterior annular channel 641, through coupling channel(s) 643 and into interior annular channel 642 where it may minimize friction between shaft portion 322 and bushings 340 as driver 320 and socket 310 are rotated within housing assembly 330.

Each bushing 340 may also form a seat 644 in which a seal 650 may be positioned. Seal 650 may form a seal against shaft portion 322 to prevent hardening product, water, or other injected fluid or material from passing between shaft portion 322 and housing 630.

Figure 7:
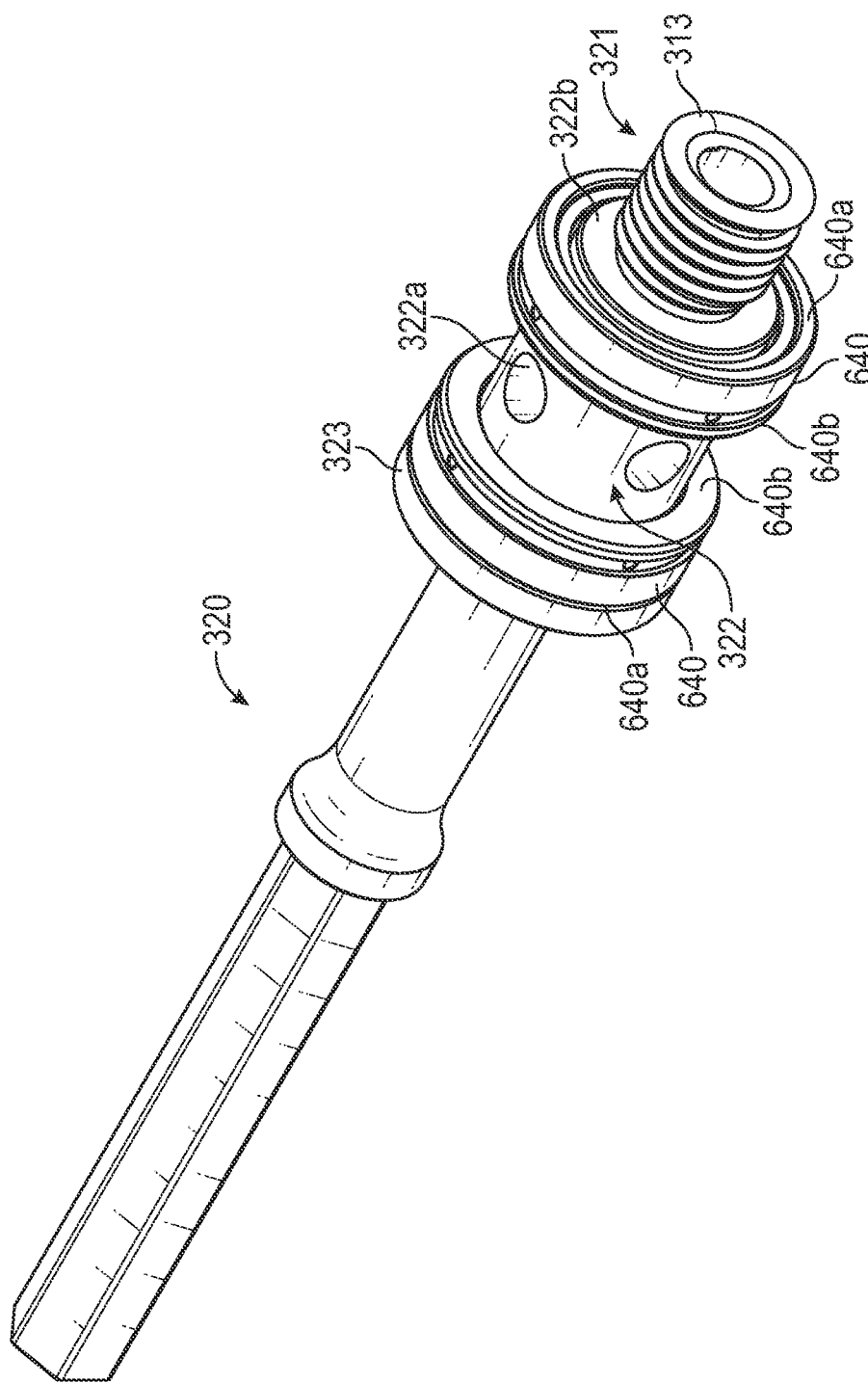
FIG. 7 is a perspective view of the injection driver assembly with the housing and socket removed.

FIG. 7 shows injection driver assembly 300 with socket 310 and housing 630 removed. As shown, an o-ring (or other seal) 313 could be positioned between distal coupling portion 321 and a distal end of opening 312 of socket to prevent hardening product, water, or other injected fluid or material from passing proximally out from opening 312. FIG. 7 also shows how cross channels 322a are positioned between bushings 640. For example, housing 630 and bushings 640 can be sized and configured so that exterior ends 640a of bushings 640 are positioned at distal face 322b of shaft portion 322 and against flange 323 respectively while interior ends 640b of bushings 640 are spaced apart and positioned on opposing sides of cross channels 322a.

Figure 8A:
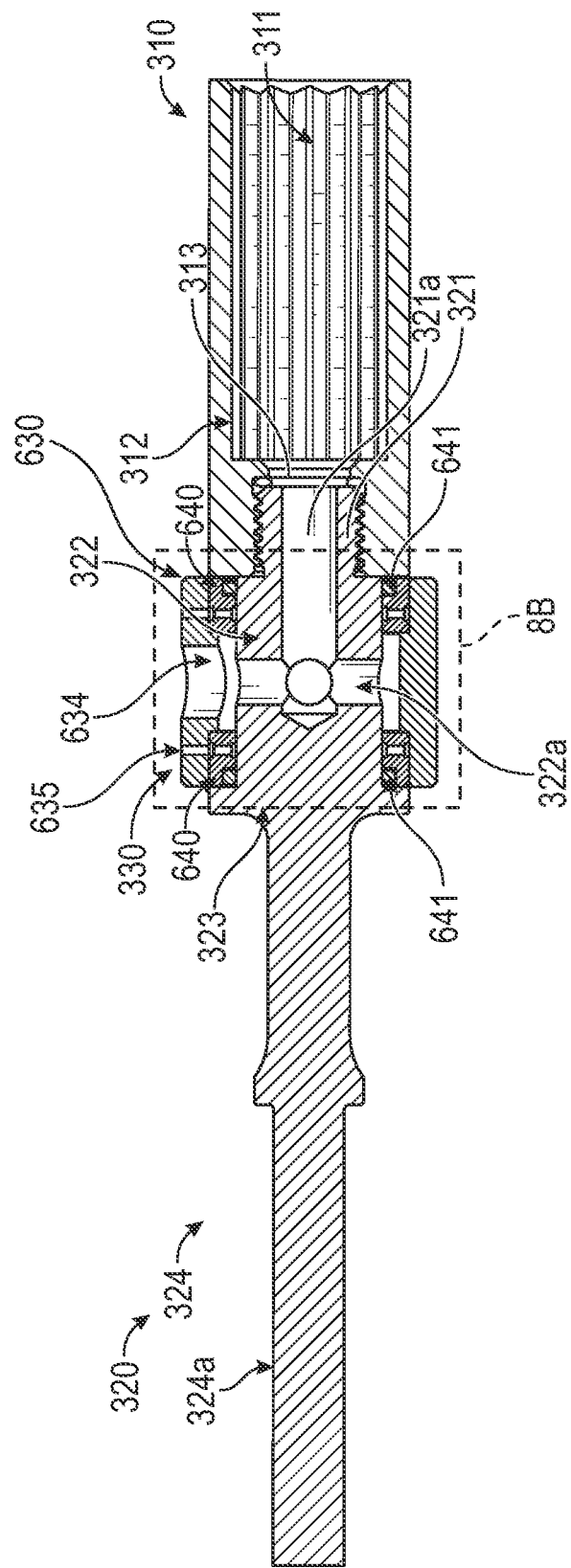
FIGS. 8A-8C are cross-sectional views of the injection driver assembly.
Figure 8B:
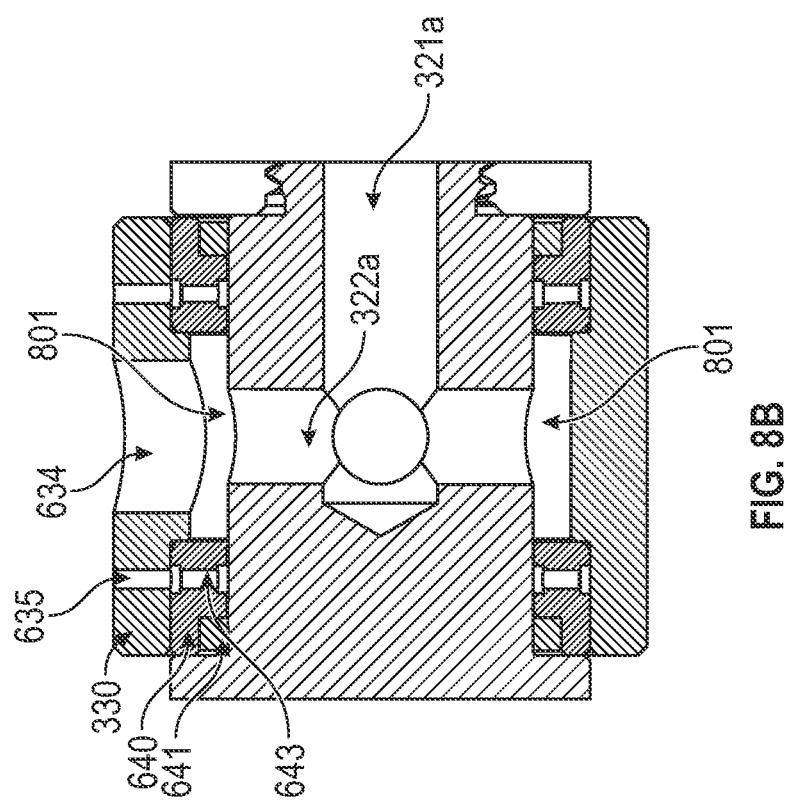
Figure 8C:
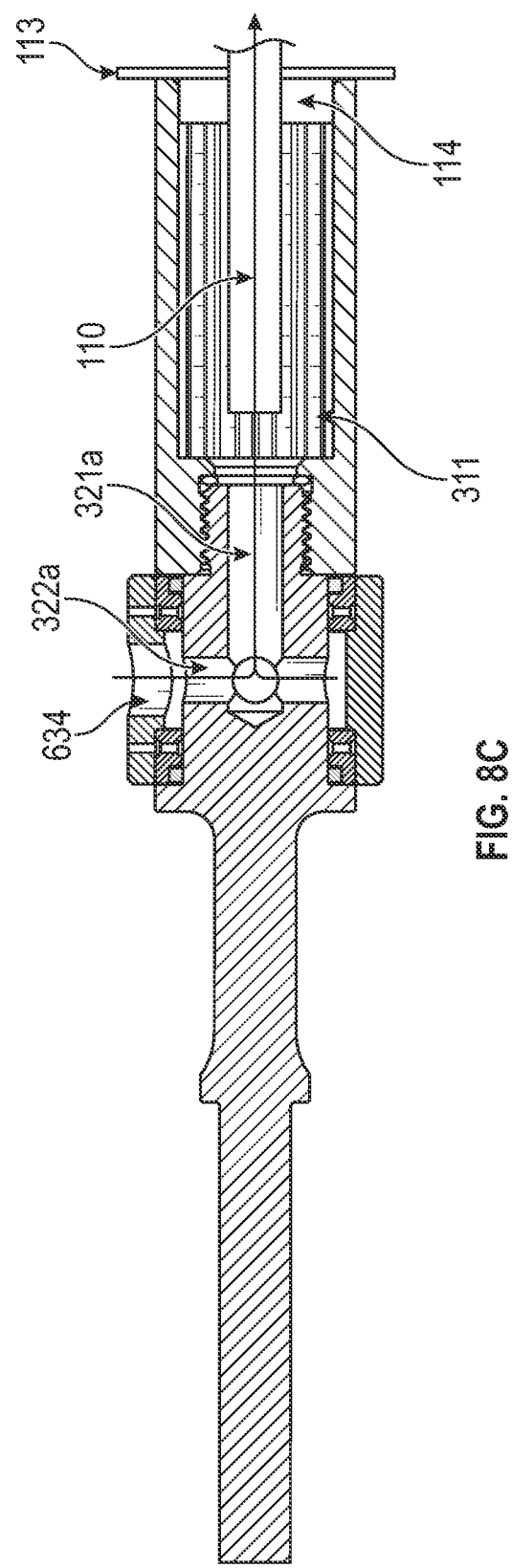

FIGS. 8A-8C are cross-sectional views of injection driver assembly 300 and will be used to further describe how injection driver assembly 300 can be used to drive in a hollow bar bolt using socket 310 and to inject hardening product, water, or other fluid or material into/through socket 310. As best seen in the close-up view of FIG. 8B, an annular pocket 801 is formed between housing 630 and shaft portion 322 and between bushings 640. Injection openings 634 and cross channels 322a extend into annular pocket 801 such that any material or fluid injected into annular pocket 801 can flow into longitudinal channel 321a and ultimately into opening 311 in socket 310.

FIG. 8C provides an example where socket 310 has been positioned around the end of a hollow bar 110 and nut 114 and then rotated to insert hollow bar bolt 100 into a structure. Before, during, and/or after rotation of socket 310, injections can be performed through injection opening(s) 634. For example, as represented by the arrow, a hardening product could be injected through injection openings 634 and into hollow bar 110 until the hardening product flows back out through the drill hole to encompass plate 113 and nut 114. After this injection, socket 310 could again be rotated to further tighten nut 114 to reach a desired tension.

In some embodiments, including the depicted embodiments, housing 630 may include two injection openings 634 by which two components of the hardening product may be injected. Upon being injected, the two components can mix and harden. In some embodiments, injection openings 634 may also be used to inject water or other flushing fluid to flush the hardening product from injection driver assembly 300.

FIGS. 9A-9D provide an example of how injection driver assembly 300 may be used on machinery 900 to facilitate the installation of hollow bar bolts in a tunnel. In this example, machinery 900 includes hoses 901 that are connected to injection openings 634 and a drilling component 902 to which driver 320 is coupled and by which driver 320 is rotated. Notably, housing assembly 330 does not rotate as drilling component 902 rotates driver 320 and socket 310.

Figure 9A:
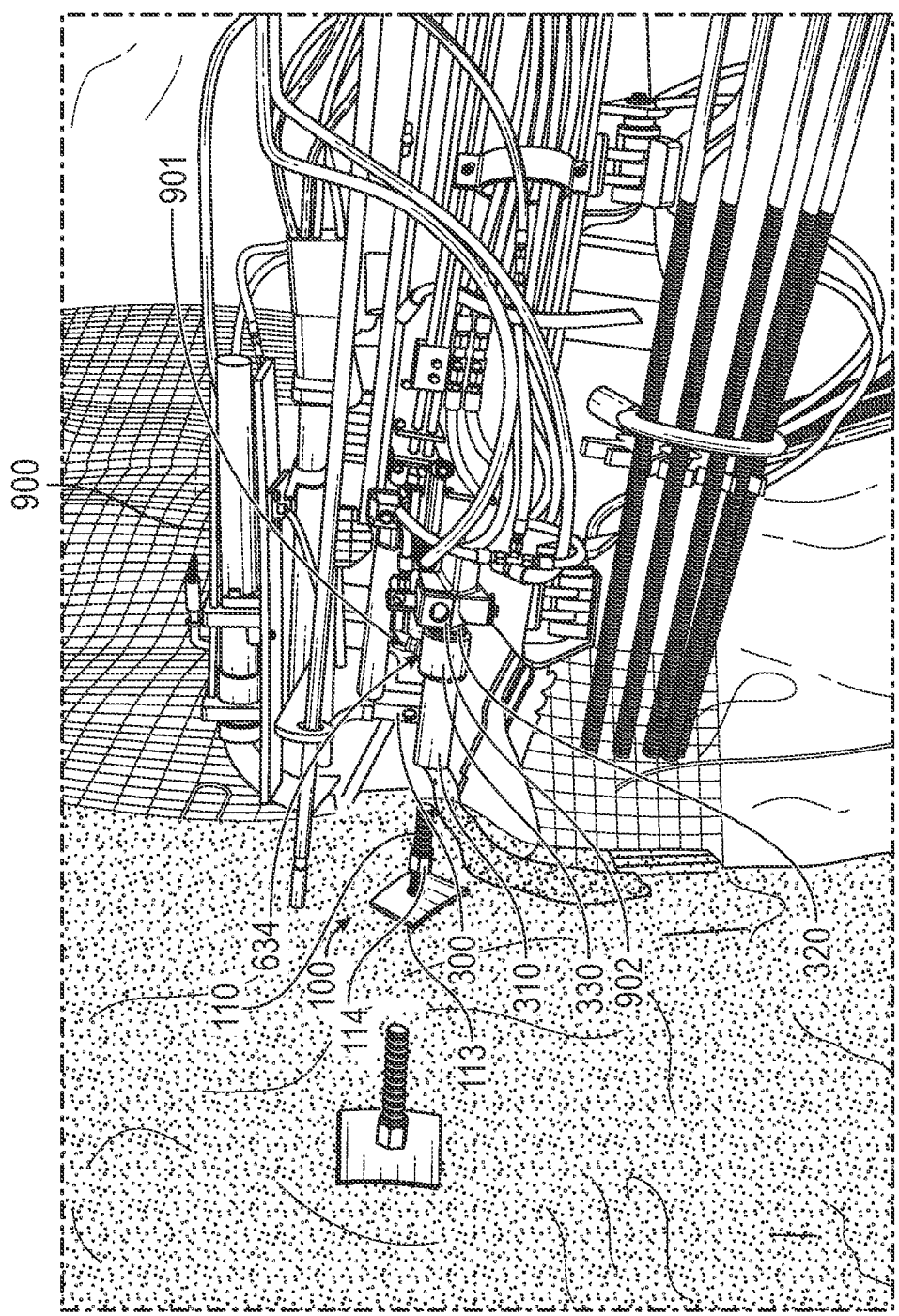
FIGS. 9A-9D provide an example of how the injection driver assembly can be used to install a hollow bar bolt.

In FIG. 9A, a hollow bar bolt 100 has already been substantially driven into the tunnel wall and machinery 900 is being prepared to inject hardening product into hollow bar 110 via injection driver assembly 300. For example, residual water in hoses 901 is being ejected from socket 310 as the hardening product is pumped through the hoses 901. Although machinery 900 has pulled socket 310 back away from hollow bar bolt 100, this is not necessary. Machinery 900 may maintain socket 310 overtop nut 114 after driving hollow bar bolt 100 into the wall.

Figure 9B:
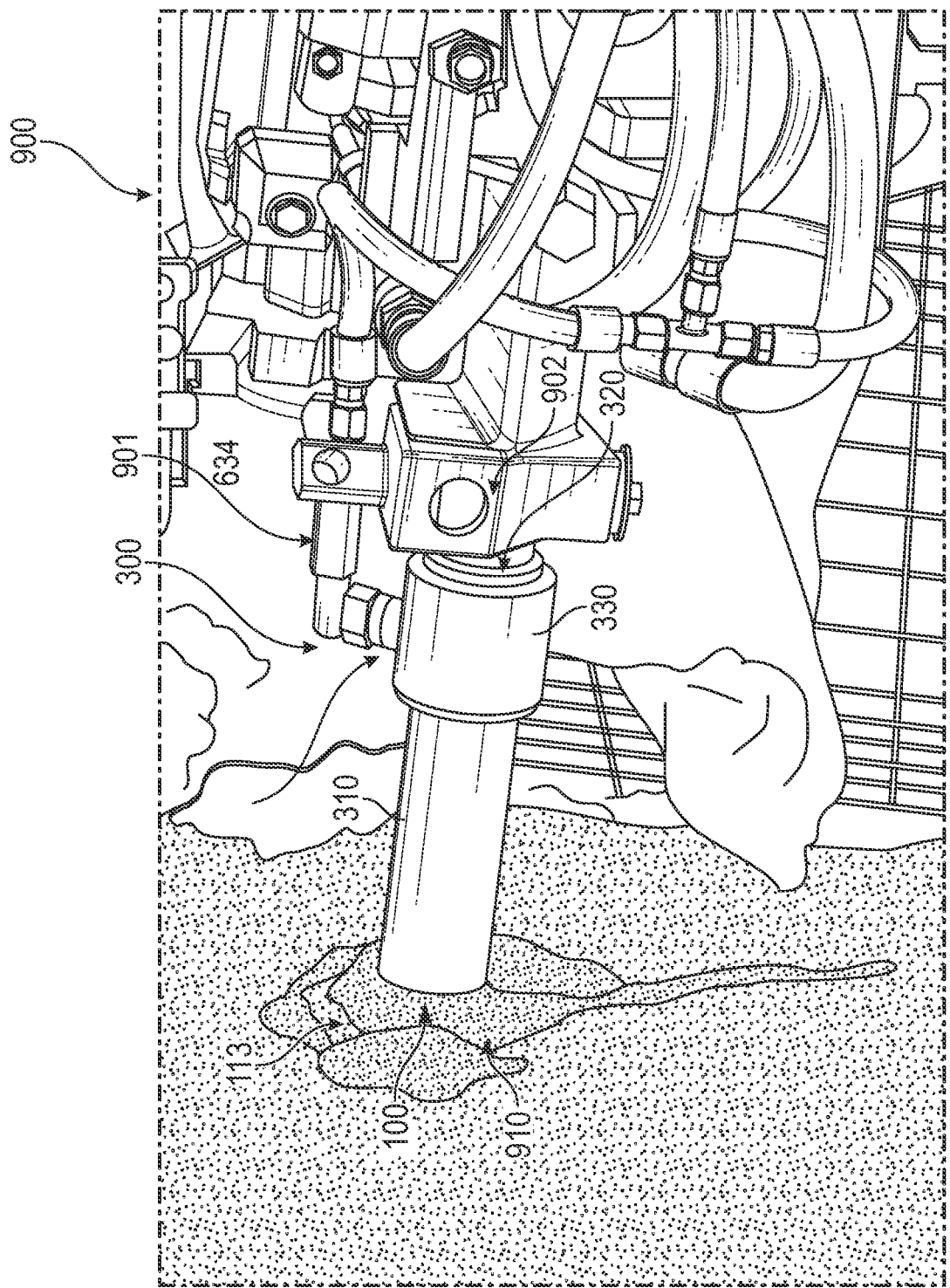

Turning to FIG. 9B, machinery 900 has positioned socket 310 overtop hollow bar 110 and nut 114 and is injecting hardening product 910 through hoses 901 and into injection openings 634. Hardening product 910 will then flow through cross channels 322a and longitudinal channel 321a, into opening 311, and then through hollow bar(s) 110 and back out through the drill hole until encasing plate 113 and nut 114. Notably, at any point during the injection of hardening product 910, machinery 900 could drive drilling component 902 to rotate socket 310.

Figure 9C:
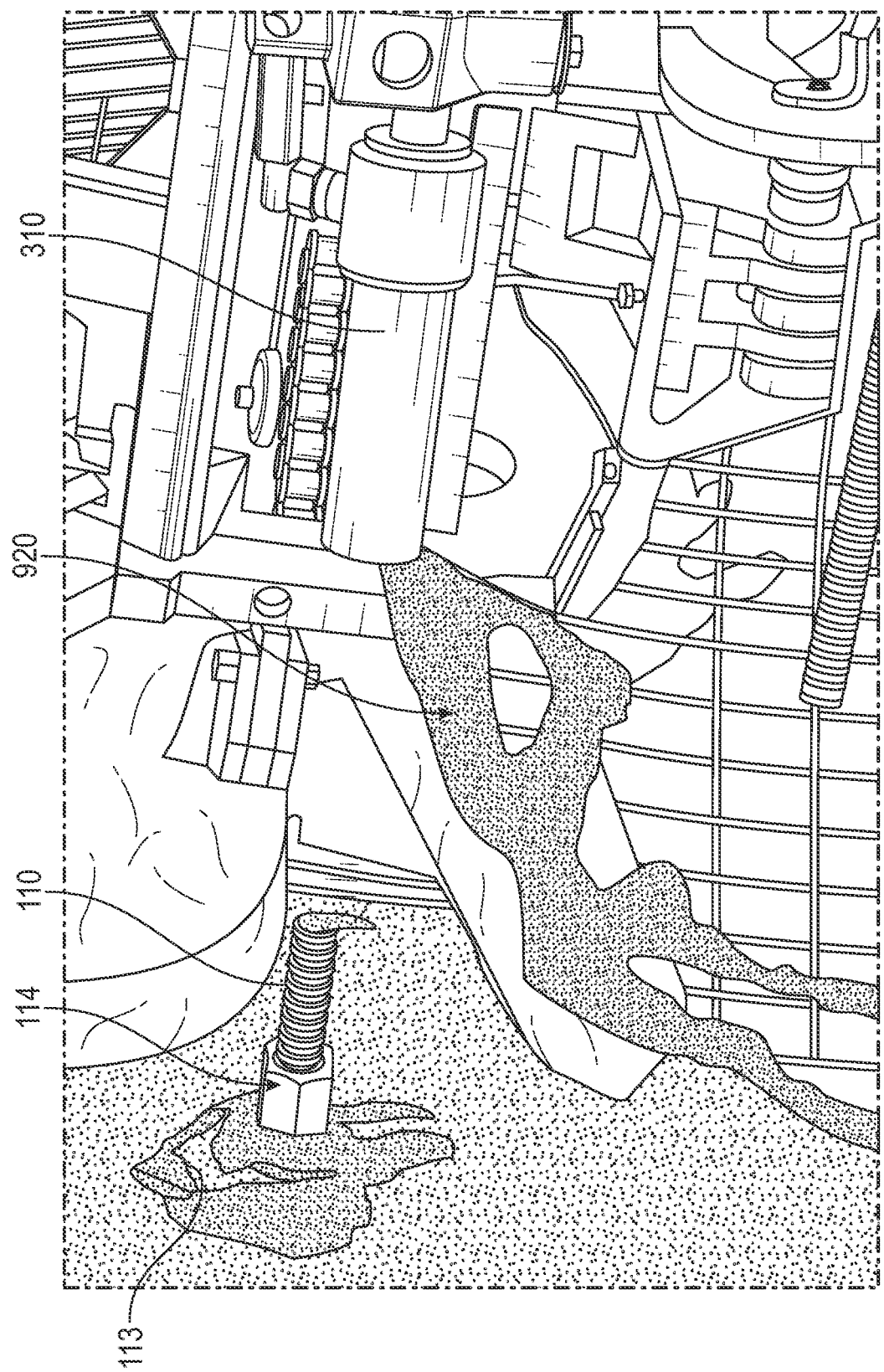
Figure 9D:
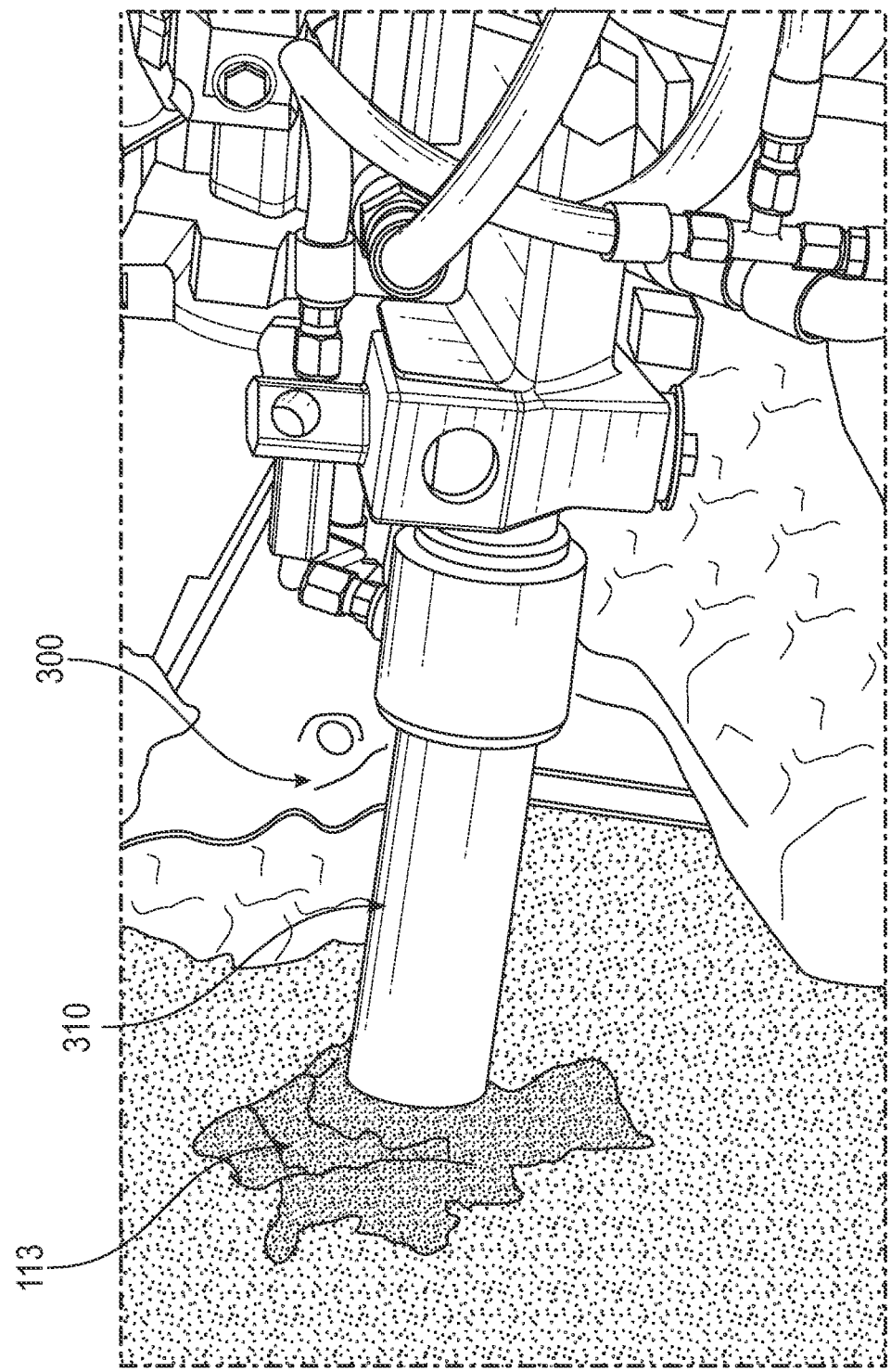

Turning to FIG. 9C, machinery 900 has now pulled socket 310 away from hollow bar bolt 100. Machinery 900 may then pump water through hoses 901 to flush the hardening product from injection driver assembly 300. This flushing may be performed while hardening product 910 is hardening around hollow bar bolt 100.

Turning to FIG. 9D, machinery 900 has again positioned socket 310 overtop nut 114 and is driving drill component 902 to cause socket 310 to tighten hollow bar bolt 100 to a desired tension. Machinery 900 may then move injection driver assembly 300 to a position where the next hollow bar bolt 100 is to be installed, and the process can be repeated. Machinery 900 may use injection driver assembly 300 throughout this process without needing to switch back and forth between separate drilling and injection components. In this way, injection driver assembly 300 can enhance the efficiency of installing hollow bar bolts.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. An injection driver assembly comprising:
   a socket that is configured to rotate a hollow bar bolt;
   a driver that is coupled to the socket and configured to rotate the socket; and
   a housing assembly that is positioned around the driver and configured to enable the socket and driver to rotate relative to the housing assembly;
   wherein the housing assembly, the driver, and the socket form a pathway for injecting a hardening product into the hollow bar bolt while the hollow bar bolt is positioned within the socket;
   wherein the housing assembly includes a housing having one or more injection openings that form part of the pathway and opposing bushings that are positioned inside the housing on opposing sides of the one or more injection openings. wherein each bushing includes an exterior annular channel and the housing includes lubricant openings that align with the respective exterior annular channel. and wherein each bushing includes an interior annular channel and one or more coupling channels that extend between the exterior annular channel and the interior annular channel.

2. The injection driver assembly of claim 1, wherein the socket has a distal end forming a distal opening that is configured to receive and drive a nut of the hollow bar bolt and a proximal end forming a proximal opening that is configured to couple to the driver, the proximal opening extending into the distal opening to form part of the pathway.

3. The injection driver assembly of claim 1, wherein the driver comprises a shaft portion over which the housing assembly is positioned and a proximal coupling portion by which the driver may be coupled to machinery.

4. The injection driver assembly of claim 3, wherein the driver includes a flange positioned between the shaft portion and the proximal coupling portion.

5. The injection driver of claim 4, wherein the housing is secured between the flange and the socket when the socket is secured to the driver.

6. The injection driver assembly of claim 3, wherein the shaft portion includes a longitudinal channel and one or more cross channels that intersect with the longitudinal channel to form part of the pathway.

7. The injection driver assembly of claim 6, wherein the longitudinal channel extends through a distal end of the driver that inserts into the socket.

8. The injection driver assembly of claim 3, wherein the pathway comprises one or more channels formed in athe shaft portion of the driver, the shaft portion being configured to rotate within the housing of the housing assembly.

9. The injection driver assembly of claim 1, wherein the one or more injection openings comprise two injection openings.

10. The injection driver assembly of claim 1, wherein the housing assembly comprises opposing seals that are positioned inside the respective bushings.

11. An injection driver assembly comprising:
    a socket having a distal opening that is configured to drive a hollow bar bolt and a proximal opening, the proximal opening being open to the distal opening;
    a driver that is secured to the socket, the driver forming a longitudinal channel that is open to the distal opening of the socket and one or more cross channels that extend between an outer surface of the driver and the longitudinal channel; and
    a housing assembly that is positioned around the driver and configured to enable the socket and driver to rotate relative to the housing assembly, the housing assembly having a housing with one or more injection openings that are open to the one or more cross channels such that fluid or material injected through the one or more injection openings can pass into a hollow bar bolt that is positioned within the distal opening of the socket;
    wherein the housing assembly comprises opposing bushings that are positioned within the housing on opposing sides of the one or more cross channels. wherein each bushing includes an exterior annular channel and the housing includes lubricant openings that align with the respective exterior annular channel. and wherein each bushing includes an interior annular channel and one or more coupling channels that extend between the exterior annular channel and the interior annular channel.

12. The injection driver assembly of claim 11, wherein the driver includes a distal coupling portion that extends into the proximal opening of the socket, the longitudinal channel extending through the distal coupling portion.

13. The injection driver assembly of claim 11, wherein the one or more injection openings comprise two injection openings that are configured to couple to hoses of machinery that is also used to rotate the driver and the socket.

14. The injection driver of claim 11, wherein the proximal opening of the socket and a distal coupling portion of the drive include each include threads by which the driver is secured to the socket.

15. The injection driver of claim 11, wherein the one or more cross channels comprise four cross channels.

16. The injection driver of claim 11, wherein the driver includes a flange and the housing is secured between the flange and the socket when the socket is secured to the driver.

* * * * *